Aug. 22, 1950     W. V. THELANDER     2,519,414
FRICTION CLUTCH
Original Filed March 22, 1946
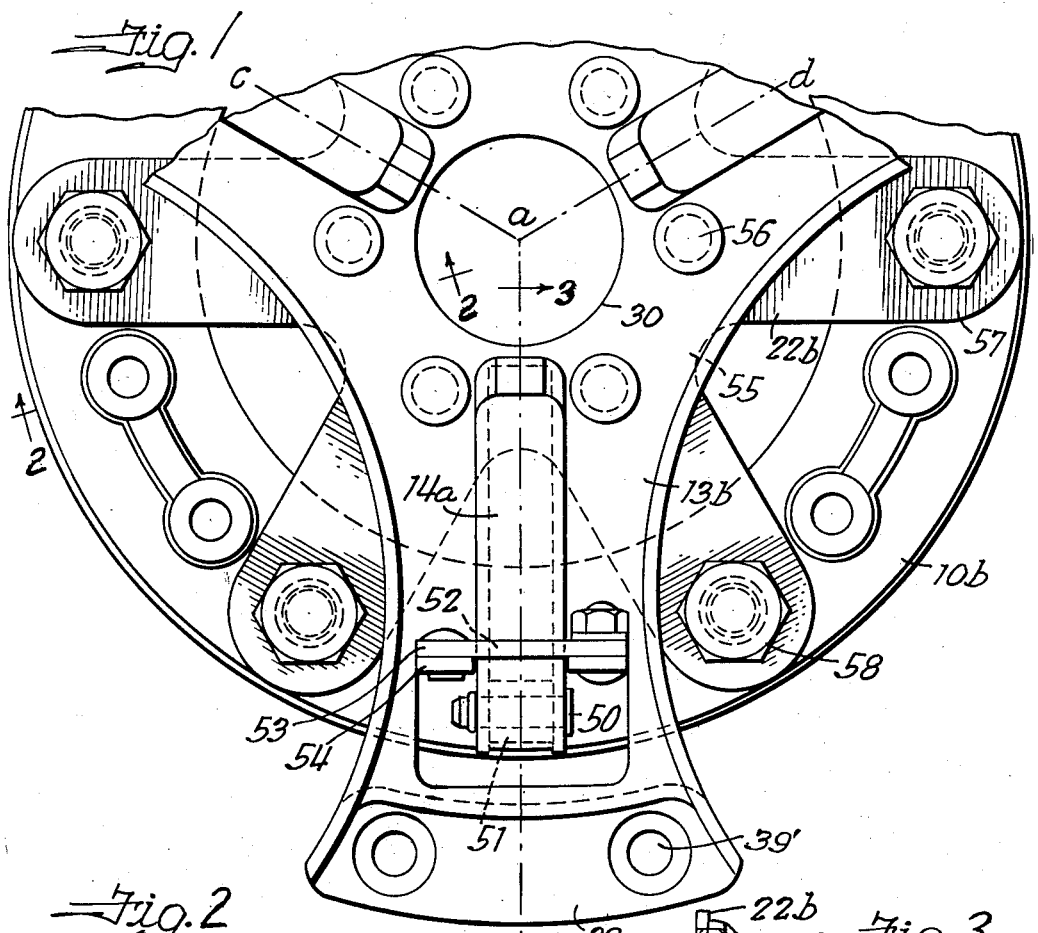
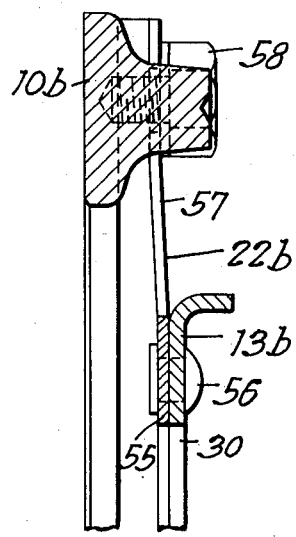
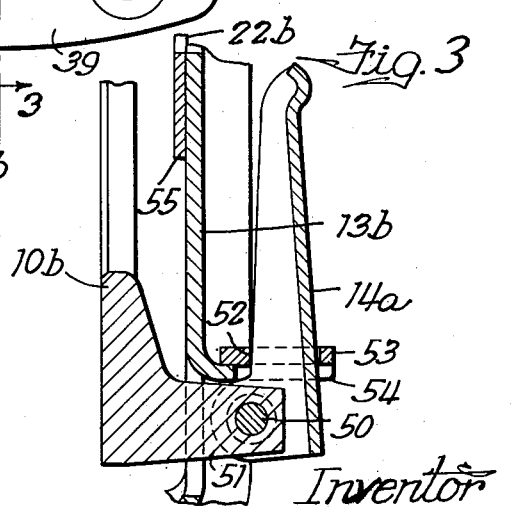
Inventor
W. Vincent Thelander Patented Aug. 22, 1950

2,519,414

UNITED STATES PATENT OFFICE 2,519,414

FRICTION CLUTCH

W. Vincent Thelander, Auburn, Ind., assignor to Dana Corporation, Toledo, Ohio, a corporation of Virginia Original application March 22, 1946, Serial No. 656,327. Divided and this application November 28, 1947, Serial No. 788,477

10 Claims. (Cl. 192—68)

This application is a division of my copending application Serial No. 656,327, filed March 22, 1946.

This invention relates to friction clutches for use on automobiles, tractors, and other vehicles, and suitable also for industrial applications.

In clutches like that disclosed in my Patent No. 2,214,780, issued September 17, 1940, the pressure plate is moved toward engaged position by novel spring-pressed release levers, and is moved toward disengaged position by spring means acting between the back plate and drive lugs on the pressure plate. However, these lugs projecting through openings in the back plate with a predetermined operating clearance caused an objectionable rattle unless special provisions were made to eliminate the hammer noise. In a copending application of Everson M. DeCoursey and myself, Serial No. 611,040, we disclose the use of small wedge-shaped blocks, suitably mounted on the back plate in the drive lug openings and arranged to have abutment with the drive lugs on the "coast" side and normally urged inwardly with respect to the axis of rotation of the clutch by suitable spring means so as to afford ample working clearance for the drive lugs in the openings only while these flying wedges are in retracted position, the clearance being taken up automatically when the flywheel attains a predetermined R. P. M., at which the flying wedges move outwardly under centrifugal force against the action of the spring means and take up all clearance.

It is the principal object of my invention to provide a simpler and more economical and more practical construction, in which a single leaf spring spider-shaped element is provided between the radially inner portion of the back plate and the back of the pressure plate, to assume drive torque when the clutch is engaged, so that the lugs on the pressure plate, which heretofore caused the objectionable rattle by reason of contact with the sides of the openings in the back plate, are kept more or less centralized with respect to said openings, thereby eliminating rattling. According to the present invention, the leaf spring spider element, besides assuming the driving torque and preventing the objectionable rattling, serves to exert the spring pressure holding the pressure plate engaged, the release levers being arranged to positively retract the pressure plate in the disengagement of the clutch.

The invention is illustrated in the accompanying drawing, in which—

Fig. 1 is a rear view of a clutch embodying my invention, and

Figs. 2 and 3 are sectional details on the correspondingly numbered lines of Fig. 1.

The same reference numerals are applied to corresponding parts throughout the views.

Referring to the drawing, the clutch illustrated comprises a pressure plate 10b and back plate 13b. The latter has three equally circumferentially spaced attaching flange portions 39, by means of which the back plate is fastened to the back of the flywheel, screws being entered through the holes 39' for that purpose. Only one of the three flange portions 39 is shown, the upper portion of the figure being broken away to conserve space in the drawing, the other two flange portions being on the center lines a—c and a—d. The pressure plate 10b cooperates in the usual way with a clutch disk (not shown) having the usual facings for engagement with the flat back face on the flywheel and the flat front face on the pressure plate, the disk being mounted in the usual way, by means of a hub portion splined on the front end of a shaft constituting the driven element, and extending rearwardly from the clutch into the gear box of the transmission in the usual way, as disclosed, for example, in my earlier Patent No. 2,214,780.

The present invention is particularly concerned with the leaf spring means 22b, which holds the pressure plate 10b in engaged position. The release levers 14a, of which there are three on the three center lines a—b, a—c, and a—d, serve positively to retract the pressure plate. Each of these levers is preferably connected by means of a cross-pin 50 at its outer end to a lug 51 projecting rearwardly from the pressure plate, the levers being fulcrumed intermediate their ends in openings 52 provided therefor in plates 53 that are secured to lugs 54 struck rearwardly from the web of the back plate. The release levers are, of course, operated by a throw-out collar at their inner ends. The leaf spring means comprises one-piece leaf spring spider 22b interconnecting the back plate and pressure plate to assume drive torque and normally urge the pressure plate away from the back plate toward engaged position. The spring spider 22b has a perforated circular hub portion 55 which is riveted, as indicated at 56, at circumferentially spaced points to the web of the back plate in concentric relation thereto and around the center hole 39 therein, and this spider has six radially projecting arms 57 in equally circumferentially spaced relation which are arranged two between each pair of adjacent release levers, only four appearing in the drawing. The outer ends of the arms 57 are fastened by screws 58 to the pressure plate, these screws being entered through holes in the end portions of the arms and threaded in registering holes provided in the pressure plate.

In operation, the spring spider 22b obviates the necessity for spring loading the release levers 14a, because it exerts the spring pressure itself holding the pressure plate 10b engaged, the levers 14a being used only for positively disengaging the clutch. The spring spider 22b also serves to assume the drive torque, thereby giving the desired spring cushioned drive from the back plate 13b to the pressure plate 10b, while maintaining the pressure plate accurately centered in relation to the back plate for smooth operation, and, inasmuch as the lugs 51 are kept more or less centered in relation to the openings in the back plate 13b and cannot come into contact with the sides of the openings, the objectionable rattling previously mentioned is eliminated. This construction is also of advantage in the shipment of the clutch assembly, because the spider 22b ties the back plate 13b and pressure plate 10b together in a unitary assembly. That, of course, also facilitates installation. This clutch is obviously well ventilated, because the pressure plate 10b is exposed throughout the major portion of its circumference between those portions 39 of the back plate 13b that are attached to the flywheel, and the radially projecting arms 57 of the spring spider 22b are exposed also to a large extent between the attached portions 39 of the back plate.

It is believed the foregoing description conveys a good understanding of the objects and advantages of my invention. The appended claims have been drawn to cover all legitimate modifications and adaptations.

I claim:

1. In a clutch, a back plate having a radially inner portion from which projects substantially radially a plurality of circumferentially spaced portions for attachment to a driving member, a ring-shaped pressure plate housed within the circumferentially spaced attaching portions of the back plate in radially outwardly spaced relation to the radially inner portion of said back plate and adapted to engage a driven member and engage it with the driving member, a plurality of clutch actuating levers mounted in circumferentially spaced relation on the radially projecting attaching portions of said back plate and operatively associated with the pressure plate to shift the same axially, and a single leaf spring spider comprising a central hub portion attached to the radially inner portion of said back plate and a plurality of outwardly reaching flexible arms integral with and supported by the hub portion at their inner ends and attached at their outer ends to the pressure plate to transmit drive between said plates and maintain centered relationship therebetween while normally urging said pressure plate axially in one direction.

2. In a clutch comprising a back plate attached to a driving member, a pressure plate housed within the back plate and adapted to engage a driven member and engage it with the driving member, a single leaf spring spider comprising a central hub portion attached to the back plate and a plurality of outwardly reaching flexible arms integral with and supported by the hub portion at their inner ends and attached at their outer ends to the pressure plate to transmit drive between said plates and maintain centered relationship therebetween while normally urging said pressure plate axially in a forward direction to engaged position, and clutch release lever means mounted on said back plate and operatively associated with said pressure plate to move the same rearwardly to disengaged position.

3. In a clutch, a back plate having a radially inner portion from which projects substantially radially a plurality of circumferentially spaced portions for attachment to a driving member, a ring-shaped pressure plate housed within the circumferentially spaced attaching portions of the back plate in radially outwardly spaced relation to the radially inner portion of said back plate and adapted to engage a driven member and engage it with the driving member, flexible leaf spring means attached to said radially inner portion of said back plate and extending substantially radially outwardly and attached to said pressure plate to transmit drive between said plates and maintain centered relationship therebetween while normally urging said pressure plate axially away from the back plate to engaged position, and clutch release lever means mounted on said radially projecting attaching portions and operatively associated with said pressure plate to move the same toward the back plate to disengaged position.

4. In a clutch, a back plate having a radially inner portion from which projects substantially radially a plurality of circumferentially spaced portions for attachment to a driving member, a ring-shaped pressure plate housed within the circumferentially spaced attaching portions of the back plate in radially outwardly spaced relation to the radially inner portion of said back plate and adapted to engage a driven member and engage it with the driving member, a plurality of clutch actuating levers mounted in circumferentially spaced relation on the radially projecting attaching portions of said back plate and operatively associated with the pressure plate to retract the pressure plate to disengaged position, and a single leaf spring spider comprising a central hub portion attached to the radially inner portion of said back plate and a plurality of outwardly reaching flexible arms integral with and supported by the hub portion at their inner ends and attached at their outer ends to the pressure plate to transmit drive between said plates and maintain centered relationship therebetween while normally urging said pressure plate axially away from the back plate to engaged position.

5. In a clutch comprising a back plate attached to a driving member, a pressure plate housed within the back plate and adapted to engage a driven member and engage it with the driving member, flexible leaf spring means radially disposed and attached at its radially inner portion to said back plate and at its radially outer portion to said pressure plate to transmit drive between said plates and maintain centered relationship therebetween while normally urging said pressure plate axially in a forward direction to engaged position, and clutch release lever means mounted on said back plate and operatively associated with said pressure plate to move the same rearwardly to disengaged position.

6. In a clutch comprising a back plate attached to a driving member, a pressure plate housed within the back plate and adapted to engage a driven member and engage it with the driving member, a single leaf spring spider comprising a central hub portion attached to the back plate and a plurality of outwardly reaching flexible arms integral with and supported by the hub portion at their inner ends and attached at their outer ends to the pressure plate to transmit drive between said plates and maintain centered relationship therebetween while normally urging said pressure plate axially in one direction, and clutch actuating levers mounted on the back plate and operatively associated with said pressure plate to move the same axially and accordingly determine engagement and disengagement of the clutch.

7. In a clutch, a back plate having a radially inner portion from which projects substantially radially a plurality of equally circumferentially spaced portions for attachment to a driving member, a ring-shaped pressure plate housed within the circumferentially spaced attaching portions of the back plate in radially outwardly spaced relation to the radially inner portion of said back plate and adapted to engage a driven member and engage it with the driving member, a plurality of clutch actuating levers mounted in equally circumferentially spaced relation on the radially projecting attaching portions of said back plate and operatively associated with the pressure plate to shift the same axially, and a single leaf spring spider comprising a central hub portion attached to the radially inner portion of said back plate and a plurality of outwardly reaching flexible arms in equi-angular relationship integral with and supported by the hub portion at their inner ends and attached at their outer ends to the pressure plate between the attaching portions of said back plate to transmit drive between said plates and maintain centered relationship therebetween while normally urging said pressure plate axially in one direction.

8. In a clutch comprising a back plate attached to a driving member, a pressure plate housed within the back plate and adapted to engage a driven member and engage it with the driving member, a single leaf spring spider comprising a central hub portion attached to the back plate and a plurality of outwardly reaching flexible arms integral with and supported by the hub portion at their inner ends in equi-angular relationship and attached at their outer ends to the pressure plate to transmit drive between said plates and maintain centered relationship therebetween while normally urging said pressure plate axially in a forward direction to engaged position, and clutch release lever means mounted on said back plate in equally circumferentially spaced relationship and between the arms of said spider and operatively associated with said pressure plate to move the same rearwardly to disengaged position.

9. In a clutch comprising a back plate and a pressure plate in concentric relation, a six-armed leaf spring spider mounted at its central portion on the central portion of the back plate and drivingly connected at the outer ends of the arms to the pressure plate at six equally circumferentially spaced points and arranged to urge the pressure plate axially in one direction, and three clutch release levers in equally circumferentially spaced relation, each midway between two adjacent spider arms, mounted on the back plate and operatively associated with the pressure plate to move the same axially and accordingly determine engagement and disengagement of the clutch.

10. In a clutch comprising a back plate and a pressure plate in concentric relation, a leaf spring for flexibly drivingly connecting the back plate and pressure plate comprising a central ring-shaped hub portion adapted to receive fastening means for fastening the same to the back plate, and a plurality of outwardly reaching flexible arms integral with and supported by the hub portion at their inner ends and adapted to receive fastening means at their outer ends for fastening the same to the pressure plate, means for fastening the ring-shaped hub portion to the back plate and means for fastening the outer ends of said arms to the pressure plate.

W. VINCENT THELANDER.

REFERENCES CITED

The following references are of record in the file of this patent:

UNITED STATES PATENTS

| Number | Name | Date |
|---|---|---|
| 539,161 | Almond | May 14, 1895 |
| 2,117,482 | Klix | May 17, 1938 |
| 2,126,149 | Spase | Aug. 9, 1938 |
| 2,169,787 | Becker | Aug. 15, 1939 |
| 2,171,908 | Beringer | Sept. 5, 1939 |
| 2,268,718 | Newton | Jan. 6, 1942 |
| 2,368,193 | Boynton | Jan. 30, 1945 |

FOREIGN PATENTS

| Number | Country | Date |
|---|---|---|
| 613,940 | France | of 1926 |